April 25, 1933.  F. COORS, JR  1,905,442

METHOD OF PRODUCING MOTION PICTURE FILM

Filed June 2, 1931

*Fig.6.*

Fritz Coors, Jr.
Inventor,
Newton M. Cerruris
By Rolla N. Carter
Attorneys

Patented Apr. 25, 1933

1,905,442

UNITED STATES PATENT OFFICE

FRITZ COORS, JR., OF BERLIN, GERMANY, ASSIGNOR TO EASTMAN KODAK COMPANY, OF ROCHESTER, NEW YORK, A CORPORATION OF NEW YORK

METHOD OF PRODUCING MOTION PICTURE FILM

Application filed June 2, 1931, Serial No. 541,703, and in Germany June 3, 1930.

My invention relates to motion picture film, and more particularly to an improved method for producing motion picture film for projection purposes.

There are a great many uses for motion pictures wherein it is neither desirable nor necessary to enlarge the view to such an extent as is done in motion picture theatres, in which small views could be employed with equal efficiency.

My present invention has for its object a method for producing a printed film which will effect a considerable saving in the amount of film necessary for a given purpose, and which is peculiarly adapted to effect an economy of film in such cases as are suitable for the employment of a smaller view.

Another object of my invention is to provide a method for producing a printed motion picture film which contemplates the making of more than one series of pictures positioned side by side and extending longitudinally of the film, the splitting of the film to separate the individual series of pictures, and joining together these series end to end to form a continuous strip or film.

Another object of my invention is to provide a method for producing a printed film which has the advantage of recording a large number of exposures without reloading the camera, and also has the advantage of projecting from a single series film which eliminates changing of the roll or reversing of the projector mechanism as is ordinarily the case when projection is made from a film having more than one series of pictures on the width of the film.

Heretofore when more than one series of pictures have been produced side by side on a single film difficulty in editing has been encountered for an undesirable portion of one series could not be removed without removing a possibly desirable portion of the other series appearing on the same length of film. A film made in accordance with my invention may be edited and titled as readily as can the ordinary single series film.

In practicing my invention an ordinary film is run through the camera to expose one-half width of the film. The film is then reversed and again passed through the camera, exposing the other half width of the film which produces a negative having two series of pictures running side by side along the length of the film but extending in opposite directions. The positive of this film is now accurately split down the middle and one strip is turned end for end and spliced to the other strip. In this way a continuous film is formed having one continuous series of pictures and having sprocket perforations along one side of its length.

A better understanding of my invention will be had from the following description when read in connection with the accompanying drawing in which Figure 1 is a section of a length of film upon which two series of pictures have been produced;

Figure 6 is a continuous single width strip formed from the section of film shown in Figure 5.

Figure 1:
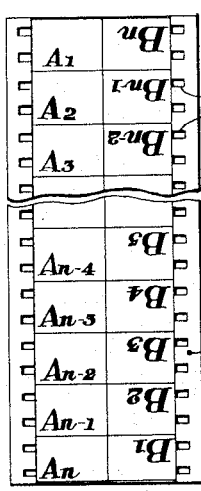
Figure 2:
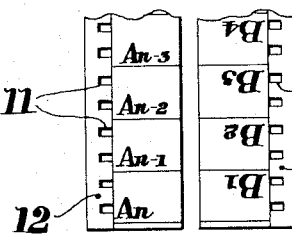
Figure 2 is the same section after splitting.
Figure 3:
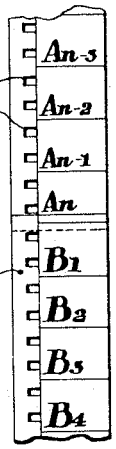
Figure 3 is the continuous strip formed by joining together end for end the lengths produced by splitting.

Refering to the drawing, an ordinary film 10 having the usual sprocket perforations 11 is passed through a camera in any well known manner and a series of exposures $A_1$ to $A_n$ are made along one-half of its width. The film 10 is then passed through the camera in the opposite direction and a series of exposures $B_1$ to $B_n$ are made along its remaining half width. The film is then developed by a reversal process to produce two series of pictures corresponding to the two series of exposures $A_1$ to $A_n$ and $B_1$ to $B_n$. The film is now split along its median line to form two separate strips 12 and 13 each having a complete series of pictures along its length. The end of the strips 12 and 13 are now joined together to form one continuous strip 14. It is to be noted that the strips 12 and 13 are so joined that the first picture $B_1$ of the series $B_1$ to $B_n$ on the strip 13 registers with and follows the last picture $A_n$ of the series $A_1$ to $A_n$ on the strip 12.

It will now be seen that in practicing my invention the resulting film 14 for projecting purposes is one-half the width and twice the length of the initial film 12 which effects a 75 per cent economy when four pictures are produced on a normal or ordinary picture area.

It is obvious that the film 10 may be of any desired width and length, may or may not have any form of perforation, and of course more than two series of pictures may be produced side by side on a single film, although at present I prefer only two series of pictures so as to more easily employ existing equipment.

Figure 4:
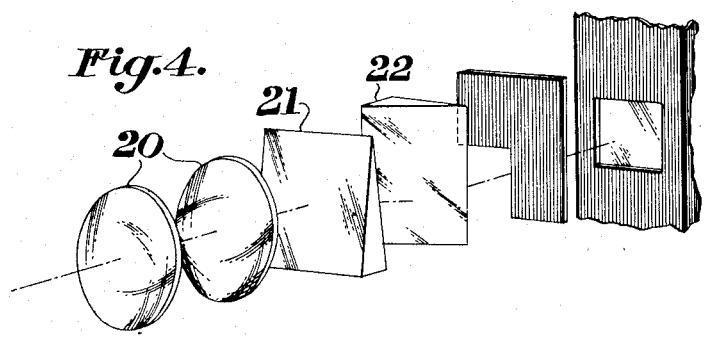
Figure 4 is an exploded view of a camera optical system altered to take a picture of sub-normal size.

In order to expose the film in accordance with this invention, the pull-down of the camera should be altered to move the film forward one-half its usual distance and the exposure aperture should be shielded as shown in Figure 4 so as to expose only one-quarter of the normal area of a picture frame. In shielding three-quarters of the normal exposure aperture of the camera as shown in Figure 4, the optical axis of the lens is not in line with the center of the picture area. This can be overcome by shifting the lens as a whole or it may be overcome by shifting the image bearing light by placing two wedge shaped prisms 21 and 22 behind the lens 20. The first prism 21 bends the ray of light from the optical axis of the lens, and the second prism 22 bends it in a direction such that it emerges parallel to the rays which fall on the first prism and coincides with the center of the decreased aperture.

In practicing my invention upon film of smaller width, one-half of the exposure window is shielded and the film is then exposed first on one-half and then on the other half of its width, and in order that the pictures shall have a greater breadth than height, the taking apparatus is operated on its side.

Figure 5:
Figure 5 is a section of a film having the pictures of each series side by side longitudinally of the film.

This last described method of taking pictures will produce a film having pictures arranged as shown in Figures 5 and 6 which can be properly projected either by utilizing a horizontal projector or by inserting a prism in the optical system to rotate the projected image as is well known.

It will be obvious that my invention may be practiced in various ways such as making more than one series of exposures upon the negative film, splitting this film, and printing each series upon a separate positive film of suitable width, or the entire negative may be printed upon a positive film and then the various series of pictures separated by splitting the positive film.

While I have described in detail two methods of practicing my invention to comply with the requirements of the statutes, I wish it understood that I do not intend to be limited to the exact methods described inasmuch as, in view of the disclosure, obvious modifications will readily present themselves to those familiar with this art without departing from the spirit of my invention or the scope of the claims herein.

What I claim as new and desire to secure by Letters Patent of the United States is:

1. The method of producing a motion picture film which comprises making longitudinally of a film one series of exposures to true images of an objective field, making alongside the first series but in the reverse direction another series of exposures to true images of an objective field, the individual exposures of the second series being inverted with respect to those of the first series, developing the exposed film by a reversal process, slitting the film between the two longitudinal series of pictures resulting from said developing and joining one end of the first series to one end of the second series to form a continuous strip of film with a continuous series of similarly positioned pictures.

2. The method of producing a motion picture film which comprises making longitudinally of a film one series of exposures to true images of an objective field, making alongside the first series but in the reverse direction another series of exposures to true images of an objective field, the individual pictures having their longer direction which is also horizontal of the picture transverse to the film, developing the exposed film by a reversal process, slitting the film between the two longitudinal series of pictures resulting from said developing and joining one end of the first series to the end of the second series to form a continuous strip of film.

3. The method of producing a motion picture film which comprises making longitudinally of a film one series of exposures to true images of an objective field, making alongside the first series but in the reverse direction another series of exposures to true images of an objective field, and having only one perforation for each picture area the perforations occupying a definite position with respect to each such picture area, developing the exposed film by a reversal process, slitting the film between the two longitudinal series of pictures resulting from said developing and joining one end of the first series to one end of the second series to form a continuous strip of film.

4. A method for making motion pictures including a reversal process wherein a single film is successively exposed, submitted to a developer and then treated to produce a positive image on the original film, including the steps of exposing one longitudinal half of a sensitive film band having perforations along both borders to true images of an object field, exposing the other longitudinal half in the reverse direction to another series of exposures to true images of an object field, the individual images of the second series being inverted with respect to those of the first series, the images of both series being similarly related to the perforations on the respective halves, slitting the film between the two longitudinal series of images and joining one end of the half film carrying one series of images to one end of the other half film carrying the other series of images to form a continuous strip of film with the perforations in alignment and with the images also in alignment on the same surface and similarly positioned and constituting a single series of images all similarly located with respect to the respective perforations.

Signed at Berlin, Germany this 21st day of May 1931.

FRITZ COORS, Jr.